United States Patent [19]

Solomon

[11] 3,968,295
[45] July 6, 1976

[54] PREPARATION OF RUBBERIZED CORD FABRIC

[75] Inventor: Thomas S. Solomon, Brecksville, Ohio

[73] Assignee: The B. F. Goodrich Company, Akron, Ohio

[22] Filed: Feb. 22, 1972

[21] Appl. No.: 228,143

[52] U.S. Cl. .............................. 428/250; 156/110 A; 156/110 R; 156/110 MD; 427/175; 427/430
[51] Int. Cl.² ..................... B32B 3/02; D04D 5/00; D04D 7/08
[58] Field of Search ................ 117/7, 76 T, 77, 163, 117/161 UT, 161 UD, 161 UC; 260/80.73; 156/110 A, 110 R, 110 MD; 428/114, 250; 427/430 R, 434 D, 434 E, 175

[56] References Cited
UNITED STATES PATENTS

| | | | |
|---|---|---|---|
| 2,879,824 | 3/1959 | Koch | 117/163 X |
| 2,998,330 | 8/1961 | Snyder et al. | 117/161 UT X |
| 3,007,887 | 11/1961 | Essig | 260/29.6 |
| 3,231,533 | 1/1966 | Garrett et al. | 117/140 A X |
| 3,284,394 | 11/1968 | Suen et al. | 260/80.73 X |
| 3,330,689 | 7/1967 | Ells et al. | 117/7 X |
| 3,352,710 | 11/1967 | Wolf et al. | 117/161 UT X |
| 3,364,060 | 1/1968 | Welzel et al. | 117/76 T |
| 3,380,938 | 4/1968 | Jack et al. | 117/161 UT X |
| 3,407,092 | 10/1968 | Gage et al. | 117/161 UT X |
| 3,483,075 | 12/1969 | Schmitt | 117/161 UT X |

*Primary Examiner*—Michael R. Lusignan
*Assistant Examiner*—Shrive P. Beck
*Attorney, Agent, or Firm*—W. A. Shira, Jr.

[57] ABSTRACT

Deterioration of cord dip coating with resultant loss of adhesion of subsequently applied rubber to tire cords is avoided by using a cord dip composition including latex and an acrylic ester copolymer containing acrylic acid and methylol acrylamide.

25 Claims, No Drawings

PREPARATION OF RUBBERIZED CORD FABRIC

BACKGROUND OF THE INVENTION

It has been conventional for many years to manufacture pneumatic tires from cord fabric made by dipping an array of parallel cords in a resorcinol formaldehyde latex composition and drying the dipped cords under tension, followed by application of unvulcanized rubber. The tires are then built from the rubberized cords and other components, including beads at the edges of the tire structure, and wear resistant treads.

In preparing the rubberized cord fabric, it is sometimes convenient to be able to dip-coat and dry the cords as a separate operation from the rubberizing or application of unvulcanized rubber to the coated cords. However, it has been found that if the dipped and dried cords are exposed for a significant time to the atmosphere or to the sun, the usual rubber compositions will not adhere satisfactorily to the cords. Consequently, it has been the general practice to apply the rubber to the dipped and dried cords immediately in a single operation without interruption, or else to protect the dipped and dried cords by an opaque impervious wrapping during the interval between dip-coating and rubberizing.

In spite of all precautions, some lots of rubberized cord fabric have been found to have inadequate adhesion of rubber to the cords and have had to be scrapped. Moreover, if some operating problem should require temporary interruption of the dipping and drying process so that partly processed material is exposed for an hour or more before it can be rubberized or otherwise protected from exposure, that portion of the material may not bond satisfactorily to the subsequently applied rubber, and if used in manufacture of tires, it might lead to separation and failure of the tires and must, therefore, be cut out and discarded.

Efforts to overcome this difficulty by use of antioxidants or antiozonants have been unsuccessful, and substantial losses have continued to result from inadequate adhesion.

The principal object of this invention, accordingly, is to provide a procedure and materials for making rubberized cord fabric which will result in a uniformly high level of adhesion of the rubber to the cords, and eliminate the losses resulting from scrapping of materials having inadequate adhesion values.

SUMMARY OF THE INVENTION

I have discovered that a new cord dip formulation containing ingredients not previously used for this purpose will permit exposure of dipped and dried cord fabrics for significant periods of time without any measurable deterioration of adhesion between the cords and the subsequently applied rubber. In addition to the elimination of the previously observed deterioration of adhesion, my new cord dip compositions will often provide a substantial increased level of adhesion, which then is maintained without reduction even after considerable periods of exposure.

These new cord dip compositions contain an adhesive rubber latex and a copolymer made from one or more esters of acrylic acid or of a substituted acrylic acid together with free acrylic acid or a substituted acrylic acid and preferably an amide of acrylic acid or of a substituted acrylic acid. Best results are obtained when a water dispersable resin which is reactive with the copolymer and capable of acting as a cross-linking agent is also present, such as a soluble resorcinol-formaldehyde resin or an epoxy resin. It is also helpful to add a paraffin wax emulsion.

When the new cord dip compositions of this invention are used, short periods of exposure to the atmosphere or to sunlight no longer result in deterioration of the adhesive bond to the subsequently applied rubber. This permits lapse of normal time periods in processing of up to a few hours to be tolerated without loss of the essential properties of the materials, and without the need for extraordinary precautions which are expensive and troublesome to carry out.

Specifically, the new cord dip compositions permit brief interruption of the dipping operation without requiring cutting out and scrapping of the length which has entered the operation but was not completely processed at the time of interruption. These compositions also permit dipping to be carried out in one location and rubberizing in another distant location without the heavy losses from unsatisfactory dipped cords which had previously been experienced.

DETAILED DESCRIPTION

The two essential constituents of the new cord dip composition of this invention are an adhesive rubber latex and a special acrylic copolymer.

The adhesive rubber latex may be the natural rubber latex of commerce, or a comparable diene polymer latex such as a latex of true synthetic rubber (cis 1,4 polyisoprene), or any of a great many kinds of latex of an adhesive vulcanizable synthetic elastomer. Preferably it is a synthetic latex of a copolymer composed predominantly of a diene such as butadiene or isoprene with a minor proportion of copolymerizable monomer such as styrene, acrylonitrile, an acrylic ester, and the like. Presently preferred is a special SBR latex made from butadiene with styrene and vinyl pyridine, widely used in cord dip compositions.

The acrylic copolymer, like the other constituents, is a known kind of material, which has previously been used for a variety of purposes such as paper coating, textile printing, and baking enamels. This copolymer is made predominantly from acrylic or substituted acrylic esters such as ethyl acrylate, methyl methacrylate, or any of a number of homologous or analogous compounds such as methyl acrylate, propyl acrylate, butyl acrylate, ethyl methacrylate, butyl methacrylate, ethyl 2-chloroacrylate, ethyl 2-cyanoacrylate, or mixtures of such esters. The other essential ingredient is acrylic acid or a homologue such as methacrylic acid. Preferably an acrylic amide such as acrylamide or N-methylol acrylamide or homologues or analogues of them are also present. They should be used in a minor proportion in the copolymer but sufficient to make it reactive toward other materials and preferably also heat settable, generally not less than about 5% of the free acid and of the amide. Preferably, the N-methylol acrylamide is present in a quantity at least equivalent to the acrylic acid so as to assure essentially complete conversion of carboxyl groups to neutral or unreactive groups during the heat setting operation. If desired, small proportions of other copolymerizable monomers may be incorporated in the copolymer, such as vinyl acetate, styrene, or acrylonitrile.

Although the benefits of this invention can be obtained by using only the foregoing two constituents in the cord dip, an adhesive rubber latex and a special acrylic copolymer as described, further advantages are secured by adding other constituents.

In particular, highest levels of adhesion have been obtained by adding an additional water-dispersable heat setting resin such as a resorcinol formaldehyde resin, or a urea formaldehyde or melamine formaldehyde resin, or an epoxy resin. In the case of the former types, the reagents (formaldehyde and resorcinol or urea or melamine) may be dissolved in the water medium with which the other constituents are mixed. In the case of an epoxy resin, it is used in liquid form and stirred into the mixture of other constituents.

Also, a further improvement in resistance to deterioration is obtainable by adding an emulsion of a paraffin wax. Preferably this is high-melting and relatively nonvolatile microcrystalline paraffin wax.

These new cord dip compositions may be applied to any of the fibrous reinforcing materials used in manufacture of rubber goods, including the natural fibers such as cotton, linen, silk, and wool, but is preferably applied to continuous filament synthetic materials such as rayon, nylon, polyester, polyvinyl alcohol, as well as inorganic filaments such as glass or steel. As is well known, some of the fiber materials give best results if pretreated, as polyester pretreated with a polyisocyanate, glass pretreated with resorcinol-formaldehyde-latex mix, and steel pretreated with cobalt naphthenate, before dipping in the compositions of this invention. The fiber materials are most widely used in the form of cord fabrics consisting of an array of parallel cords held together by the dip material and the subsequently applied rubber coating, sometimes with widely spaced weak weft yarns to hold the cords in position during the dipping and subsequent processing operations. However, these dip compositions give equally good results when applied to individual cords such as are used in braided hose or helically reinforced hose, or when applied to woven fabrics such as are used in certain types of belting and many other rubber products.

The application of the dip compositions to cords or other fiber materials can take place in the usual ways. Thus, for cord fabric it is most often done by continuously feeding the cords under high tension through a dip bath, removing excess dip composition, and passing through a high temperature drying zone to dry under tension. In some instances the web of cord material will be fed as a part of the same continuous operation to a calender or other rubberizing equipment where a coat of vulcanizable rubber is applied. In other instances it is preferred to roll up the dipped and dried cord fabric into packages of a convenient size which are then given a protective wrap before storage or shipment, in preparation for subsequent rubberizing as a separate operation.

EXAMPLE 1

A cord dip composition is prepared containing the following ingredients, in parts by weight:

| Part A | Total | Solids |
|---|---|---|
| Synthetic latex 38% | 195 | 74 |
| Water | 75 | |
| Part B | | |
| Resorcinol-formaldehyde 75% | 13 | 10 |
| Ammonia 28% | 30 | |
| Caustic soda 1½% | 15 | |
| Acrylic resin 25% | 45 | 11 |
| Part C | | |
| Formalin 37% | 8 | 3 |

-continued

| Part A | Total | Solids |
|---|---|---|
| Water | 15 | |

The three parts are separately mixed, then part B is mixed into part A, and finally part C is mixed in. The mixture is allowed to stand 16 to 24 hours before use.

The synthetic latex in this composition is a commercial material made from about 70% butadiene, 20% styrene, and 10% vinyl pyridine. The resorcinol-formaldehyde is a commercial partial reaction product of the two constituents supplied as a concentrated solution in water. The acrylic resin in this composition is a solution in ammonia water of a copolymer of 75% methyl methacrylate, 8% acrylic acid, and 17% N-methylol acrylamide.

Tire cords made of 66 nylon in a 1680/2 construction are dipped in the foregoing composition and dried under tension for 1 minute at 220° F. Other cords are dipped in a composition containing the same ingredients except that the acrylic resin is omitted. Some of each set of cords are embedded in rubber which is vulcanized. Other portions of each set of cords are exposed to sunlight for 7 hours at 80° F. They are tested by pulling the cords out of one-fourth inch of rubber at 212° F.

The cords dipped in the composition containing the acrylic ester show an adhesive strength of 30 lbs. when rubberized promptly and 29 lbs. when rubberized after exposure to sunlight. By contrast, the cords dipped in the composition without acrylic ester show an adhesive strength of 28 lbs. when rubberized promptly and only 12 lbs. when rubberized after exposure to sunlight.

EXAMPLE 2

Other dip compositions are prepared, like those of Example 1, except that the proportions of resorcinol-formaldehyde resin and of acrylic resin are modified. In the first composition, the quantity of acrylic resin is increased 50% and the quantity of formaldehyde resin is reduced 50%. The adhesive strength when cords are rubberized promptly after dipping is 29 lbs. and when rubberized after exposure to sunlight it is 25 lbs.

In other composition, the quantity of acrylic resin is decreased 50% and the quantity of resorcinol formaldehyde is increased 50% with a corresponding increase in quantity of formalin. The adhesive strength when cords are rubberized promptly after dipping is 28 lbs. and when rubberized after exposure to sunlight it is 20 lbs.

It is evident that these compositions are greatly superior to previously known materials in protecting against deterioration by sunlight but that the composition of Example 1 is the best.

EXAMPLE 3

Special acrylic resins are prepared from the following mixtures:

| | A | B | C | D | E |
|---|---|---|---|---|---|
| Methyl methacrylate | 84.5 | 75 | 62 | 73 | 68 |
| Acrylic acid | 8 | 8 | 8 | 10 | 15 |
| N-methylol acrylamide | 7.5 | 17 | 30 | 17 | 17 |

These are incorporated into cord dip compositions of the kind shown in Example 1. All show an initial strength of 23 to 25 lbs. when promptly rubberized. When exposed 24 hours to laboratory air before rubberizing, only a slight reduction in strength is observed, sometimes as little as 10% and never more than about 25% whereas cords dipped in compositions without the acrylic resins lose 60% or more of adhesive strength when exposed under the same conditions.

EXAMPLE 4

Two acrylic resins are prepared from the following monomeric materials:

|  | F | G |
|---|---|---|
| Methyl methacrylate | 46 | 37.5 |
| Ethyl acrylate | 46 | 37.5 |
| Acrylic acid | 8 | 8 |
| N-methylol acrylamide |  | 17 |

These are incorporated in cord dip compositions and tested in the same manner as in Example 3. Both deteriorate in adhesive strength only a fraction as much as the composition without acrylic resin, when exposed for a prolonged period before rubberizing, with acrylic copolymer G containing N-methylol acrylamide giving distinctly better results than H.

EXAMPLE 5

An acrylic resin is prepared like that designated B in Example 3 except that N-methylol acrylamide is replaced by acrylamide. When tested in the same manner the results are only slightly lower than those obtained with polymer B.

EXAMPLE 6

A polymer is prepared from the following monomeric materials:

| Methyl methacrylate | 75 |
|---|---|
| Vinyl acetate | 17 |
| Acrylic acid | 8 |

When incorporated in cord dip compositions and tested in the manner set forth in Example 3 this polymer gives results which average to values equal to those obtained with resin F of example 4, which likewise contains no acrylamide material.

EXAMPLE 7

The same resin described in Example 1 is incorporated in the following cord dip:

|  | Total | Solids |
|---|---|---|
| Synthetic latex 40% | 150 | 60 |
| Acrylic resin 25% | 60 | 15 |
| Ammonia 28% | 85 |  |
| Glycidyl polyether of glycerol | 10 | 10 |
| Water | 155 |  |

The glycidyl polyether of glycerol is a polyepoxy compound reactive toward carboxyl groups, and NH groups, both of which are found in the acrylic resin.

When applied to tire cords, in this case with a resorcinol formaldehyde latex composition such as is used in tire factories as a control, each rubberized before and after 20 minutes exposure to sunlight, the following adhesion results are obtained:

|  |  | Control: Resorcinol Formaldehyde Latex | Foregoing: Acrylic Epoxy Latex |
|---|---|---|---|
| 2200/3 Rayon cords | before exposure after exposure | 30 lbs. 6 lbs. | 30 lbs. 26 lbs. |
| 2000/2 Polyester cords | before exposure after exposure | 23 lbs. 4 lbs. | 25 lbs. 23 lbs. |

It is apparent that acrylic resins of the types disclosed and claimed are extremely effective in preventing loss of adhesive strength resulting from accidental or unavoidable exposure of the dip coated cords to the atmosphere or to sunlight before rubberizing of the coated cords.

I claim:

1. A process for preparing rubberized fabric free from significant deterioration in the adhesive bond of rubber to the fabric, which process comprises
    1. dipping the fabric in an aqueous dispersion containing an adhesive latex of a diene polymer and a dispersion of an acrylic copolymer having most of the links in the polymer chain of the configuration

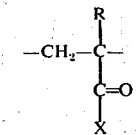

in which R is H, methyl, ethyl, Cl or CN, and in which X in a majority of the links is O–alkyl where the alkyl group has from 1 to 4 carbon atoms, X in a minority of links is OH,
    2. drying the fabric, and
    3. subsequently rubberizing the fabric.
2. A process as in claim 1, in which the fabric is an array of parallel textile cords.
3. A process as in claim 1, in which the latex is in substantial part a dispersion of a polymer made predominantly from butadiene and to a minor extent from styrene and vinyl pyridine.
4. A process as in claim 1, in which the dip composition contains a heat setting resin reactive with the acrylic resin.
5. A process as in claim 4, in which the added heat setting resin is a resorcinol formaldehyde resin.
6. A process as in claim 1, in which the acrylic copolymer is made predominantly from methyl methacrylate and to a minor extent of a material producing polymer links of the designated configuration in which X is OH.
7. A process as in claim 6, in which some of the polymer links are of the designated configuration in which X is NH-Y where Y is H or alkylol.
8. A process as in claim 6, in which the dip composition contains a soluble resorcinol-formaldehyde resin.
9. A process as in claim 1, in which X in a majority of the acrylic copolymer links is O—CH$_3$, X in a minority of the links is OH, and X in a further minority of the links is NH—CH$_2$—OH.
10. A process as in claim 1, in which the acrylic copolymer is made predominantly from methyl methacrylate, to a minor extent from acrylic or methacrylic acid, and to an extent at least equivalent to that of the acid from N-methylol acrylamide.

11. A process as in claim 7, in which the latex is in substantial part a dispersion of a polymer made predominantly from butadiene and to a minor extent from styrene and vinyl pyridine.

12. A process as in claim 11, in which the dip composition contains a soluble resorcinol-formaldehyde resin.

13. A process as in claim 1, in which the dip composition contains emulsified paraffin wax.

14. A process as in claim 12, in which the dip composition contains emulsified paraffin wax.

15. A process as in claim 2, in which the dipping and drying are carried out under tension.

16. A process as in claim 11, in which the dipping and drying are carried out under tension.

17. A process as in claim 1 in which not less than about 5% of the polymer links are of the designated configuration in which X is OH.

18. A process as in claim 7 in which not less than about 5% of the polymer links are of the designated configuration in which X is OH.

19. A process for preparing rubberized cord fabric free from significant deterioration in the adhesive bond of rubber to the fabric, which process comprises
  1. dipping an array of parallel cords under tension in an aqueous alkaline dispersion containing
    a. an adhesive latex of a diene polymer consisting in substantial part of a polymer made predominantly from butadiene and to a minor extent from styrene and vinyl pyridine,
    b. an alkali-soluble acrylic copolymer made predominantly from methyl methacrylate, to a minor extent from acrylic or methacrylic acid, and to an extent at least equivalent to that of the acid from N-methylol acrylamide,
    c. a soluble resorcinol-formaldehyde resin, and
    d. emulsified paraffin wax
  2. drying under tension, and
  3. subsequently rubberizing the fabric.

20. A process as in claim 19 in which the acrylic copolymer is made to a minor extent but not less than about 5% from acrylic or methacrylic acid.

21. A rubberized fabric, consisting of textile material, which is coated with a thin film of a composition containing an adhesive diene polymer and an acrylic copolymer having most of the links in the polymer chain of the configuration

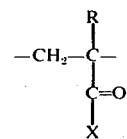

in which R is H, methyl, ethyl, Cl or CN, and in which X in a majority of the links is O-alkyl where the alkyl group has from 1 to 4 carbon atoms and X in a minority of the groups is OH, and the coated fabric is embedded in rubber.

22. A rubberized fabric as in claim 21 in which the textile material is a fabric of parallel cords, and in which the diene polymer is a polymer made predominantly from butadiene and to a minor extent from styrene and vinyl pyridine.

23. A rubberized fabric as in claim 22 in which the coating composition contains a resorcinol formaldehyde resin.

24. A rubberized fabric as in claim 21 in which not less than about 5% of the polymer links are of the designated configuration in which X is OH.

25. A rubberized fabric as in claim 23 in which not less than about 5% of the polymer links are of the designated configuration in which X is OH.

* * * * *